US007748428B2

(12) United States Patent
Pfankuch et al.

(10) Patent No.: US 7,748,428 B2
(45) Date of Patent: Jul. 6, 2010

(54) DEVICE FOR PLACING A SUSPENDED LABEL ON A BOTTLENECK

(75) Inventors: Claus Karl Pfankuch, Hamburg (DE); Gennadi Ruhl, Escheburg (DE)

(73) Assignee: Pfankuch Maschinen GmbH, Ahrensburg (DE)

( * ) Notice: Subject to any disclaimer, the term of this patent is extended or adjusted under 35 U.S.C. 154(b) by 856 days.

(21) Appl. No.: 11/594,558

(22) Filed: Nov. 7, 2006

(65) Prior Publication Data

US 2007/0107849 A1 May 17, 2007

(30) Foreign Application Priority Data

Nov. 8, 2005 (DE) .................. 20 2005 017 542 U

(51) Int. Cl.
*B32B 39/00* (2006.01)
*B65C 9/00* (2006.01)
*B65C 3/18* (2006.01)

(52) U.S. Cl. ............... 156/538; 156/542; 156/DIG. 28; 271/69; 271/226; 271/272; 271/306

(58) Field of Classification Search ................. 156/538, 156/542, DIG. 28; 271/69, 226, 272, 306
See application file for complete search history.

(56) References Cited

U.S. PATENT DOCUMENTS

| | | | | |
|---|---|---|---|---|
| 2,971,306 | A | 2/1961 | Phillips | |
| 5,637,182 | A * | 6/1997 | Kimura et al. | 156/542 |

FOREIGN PATENT DOCUMENTS

| | | | |
|---|---|---|---|
| DE | 34 42 576 | | 5/1986 |
| DE | 695 06 490 | | 4/1999 |
| DE | 100 04 789 | | 8/2001 |
| DE | 699 00 243 | | 6/2002 |
| DE | 202005017542 | | 2/2006 |
| EP | 0 693 427 | | 1/1996 |
| FR | 2 447 859 | | 8/1980 |
| FR | 2 856 031 | | 12/2004 |
| JP | 2001253418 | | 9/2001 |
| JP | 2002240811 | | 8/2002 |
| JP | 2003291931 | A * | 10/2003 |
| WO | 98/26985 | | 6/1998 |
| WO | 02/089099 | | 11/2002 |

OTHER PUBLICATIONS

English Abstract of JP 2003-291931.*
Machine translation of JP 2003-291931 in English.*

* cited by examiner

*Primary Examiner*—Philip C Tucker
*Assistant Examiner*—Sing P Chan
(74) *Attorney, Agent, or Firm*—Friedrich Kueffner

(57) ABSTRACT

A device for placing suspended labels including a multiple-page information section onto a bottleneck. The device includes a bottle conveying device for conveying bottles into a work area, and an application device having a pair of essentially parallel cantilevers which define a horizontal distance therebetween and end in the work area. Each cantilever includes a supply unit for grasping one side of the suspended label and for supplying the suspended label, wherein the cantilevers define an open intermediate space therebetween and are arranged such that a bottle reaching the work area extends with its neck into the intermediate space. A stop is provided in the area of the supply units for straightening the information portion of the suspended label.

5 Claims, 6 Drawing Sheets

DEVICE FOR PLACING A SUSPENDED LABEL ON A BOTTLENECK

BACKGROUND OF THE INVENTION

1. Field of the Invention

The invention relates to a device for mounting a suspended or hanging label on a bottleneck.

2. Description of the Related Art

It has become increasingly popular in recent time that sellers of beverages filled in bottles make them available, for example, in supermarkets with labels which are placed on the bottleneck. These labels are frequently used as advertisement carriers for special sales, for example, suspended labels are used in alcoholic beverages, wherein cocktail recipes or the like are printed on the labels. These suspended labels typically have a section with an essentially circular opening through which the bottleneck can be guided. Another section of the label either has an extended attachment, or "brochures" which are folded in a complicated manner and are placed at the section provided with the opening. This latter section then bears the information, for example, the aforementioned cocktail recipe.

Automated methods and devices suitable for placing simple suspended labels on bottlenecks have already been proposed, for example, in JP 2001253418 A or DE 695 06 490 T2.

However, there has so far been no operative possibility of placing the suspended labels mentioned last with the folded brochures or other information carriers with an acceptable processing speed in an automated manner over the bottlenecks. Instead, such suspended labels were manually placed on the bottlenecks. This method is complicated and cost-intensive.

Accordingly, there is a great demand for being able to place such suspended labels with information sections having several pages on bottlenecks in an automated procedure.

SUMMARY OF THE INVENTION

Therefore, it is an object of the present invention to provide a device of the above-described type which can meet the demand mentioned above.

In accordance with the present invention, the device for placing a suspended label provided with a multiple-page information section includes a bottle conveying device for supplying bottles into a work area. This device may be, for example, a conveyor belt, a chain conveyor or similar device. In addition, the device includes an application device, which is the significant component of the invention. This application device is arranged typically above the bottle-conveying device and has a pair of essentially parallel cantilevers which have a horizontal spacing between them and end in the work area. These cantilevers preferably extend from a higher position and are inclined relative to the horizontal and end in a position at a lower location, wherein the longitudinal extensions of the cantilevers are arranged preferably parallel to the bottle conveying device in the work area. These two cantilevers each include a supply unit for grasping a side each of the suspended label and for supplying the suspended label in general. In other words, each of the supply units grasps one side of the suspended label, and the supply units together guide the suspended label in the direction toward the free ends of the cantilevers. An open intermediate space exists between the cantilevers and the cantilevers are arranged in such a way that a bottle which reaches the work area projects with its neck into the intermediate space. The suspended label is moved by the supply units into the area of the cantilevers in which the bottleneck protrudes into the intermediate space. The bottle conveying device and the application device are preferably aligned relative to each other in such a way that the supplied bottle moves with its bottleneck into the intermediate space between the cantilevers in such a way that the bottleneck protrudes into the opening of the suspended label.

A stop is provided in the area of the supply units for straightening the information portion of the suspended label.

The stop is specifically provided for straightening the folded information portion (for example, a brochure). When processing suspended labels this portion is straightened in order to expose the opening of the suspended label, on the one hand, and, on the other hand, to ensure that this information portion rests tightly against the neck of the bottle and does not protrude therefrom.

For adapting the device to different bottle shapes and heights, it is merely necessary to adjust the position of the application device or the exact position of the cantilevers.

In accordance with an advantageous further development of the invention, the stop includes at least one stop element and a guide element. Both elements act together for straightening the information portion.

In accordance with another advantageous further development of the invention, the supply units are synchronously driven through a drive, wherein the drive of the supply units is adjusted to the drive of the bottle conveying device with respect to the start of the drive and the drive speed. The adjustment is carried out in such a way that preferably initially a suspended label is moved by the supply units with a greater conveying speed than the conveying speed of the bottle conveying device into a transition position and remains in the transition position. If a bottle moved by the bottle conveying device into the work area approaches, the drive of the supply units is controlled in such a way that when the hanging label is transferred, the drive moves with the conveying speed of the bottles, so that the bottleneck does not pull at the opening of the suspended label in order to prevent tearing of the opening of the suspended label (the suspended labels consist predominantly of a comparatively strong paper material which is resistant to tears). Rather, the hanging labels are "thrown" at a speed, which is synchronized with the conveying speed of the bottles, over the respective bottleneck. For reinforcing this synchronization, it is possible to provide, for example, a sensor, such as a light barrier, which announces the arrival of a bottle to be processed in the work area and which acts on the drive control for the supply units.

In accordance with another advantageous further development, the supply units are preferably formed by oppositely located, driven, rotating endless belts. These endless belts are arranged preferably in such a way that they rest against each other on a conveying side or maintain a distance between each other which has a maximum size which corresponds to the material thickness of the suspended label to be transported. In this manner, a suspended label is grasped at its ends between the traveling endless belts and is securely transported in this manner.

The stop is preferably arranged in the area of one of the supply units in such a way that a lower endless belt is shortened. In other words, the stop is arranged in an area in which the lower endless belt continues to travel at the oppositely located cantilever.

In order to make it possible to use the device according to the present invention for placing "normal" suspended labels in which it is not necessary to straighten a portion of the label by simple switching, the device includes a first group of two upper endless belts and a second group of three lower endless belts, wherein the two groups of endless belts are displaceable relative to each other in an essentially horizontal direction in such a way that the two endless belts of the first group engage two endless belts of the second group in order to form two supply units, wherein the stop is provided in an outwardly situated lower endless belt.

In accordance with another advantageous feature of the present invention, the application device includes a magazine for suspended labels to be placed, wherein individual suspended labels can be moved to the cantilevers.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
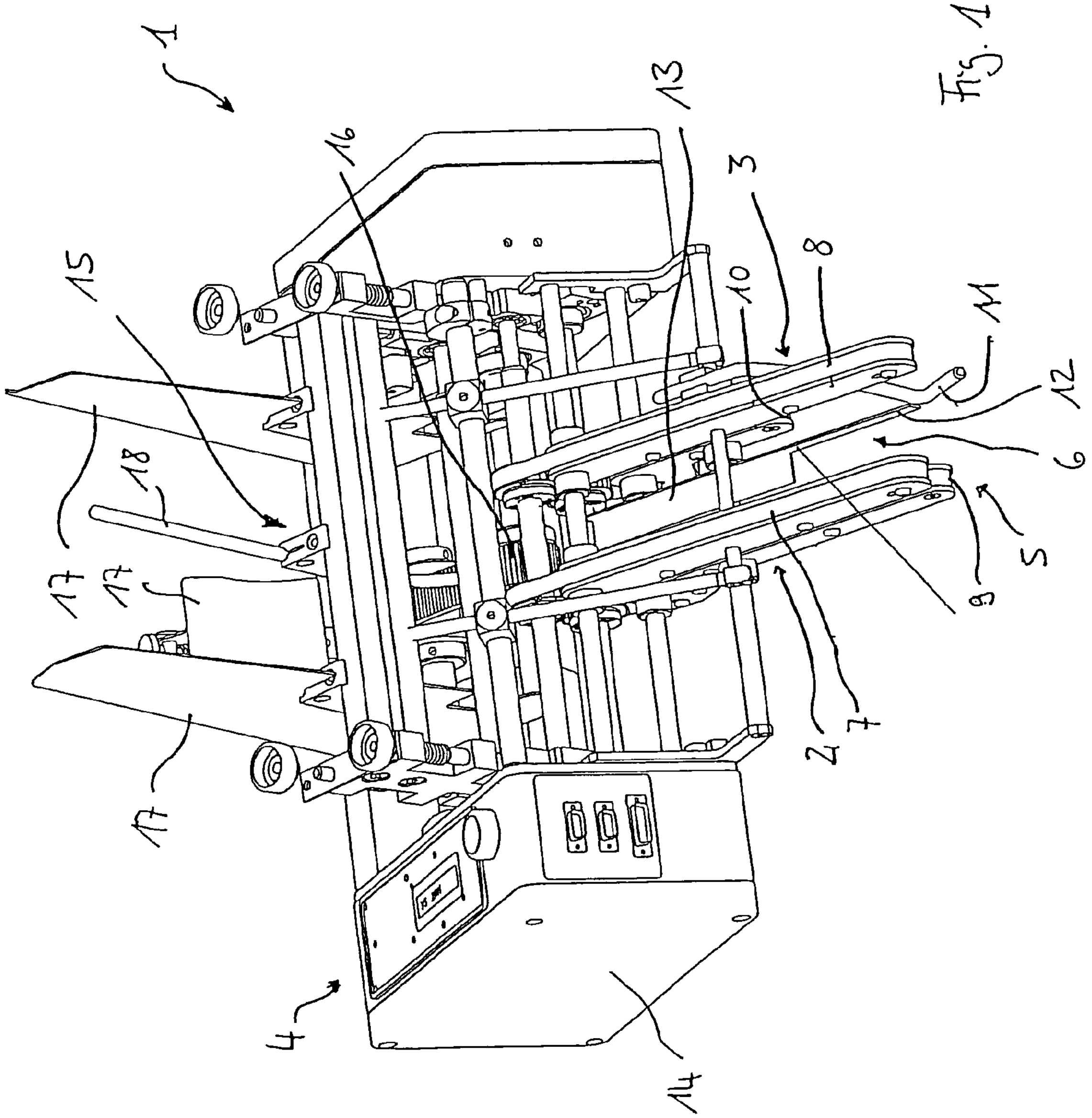
FIG. 1 is a perspective view of a device according to the present invention.

In the drawing, the same elements are provided with the same reference numerals. The Figures are schematic views and are not necessarily according to scale.

FIG. 1 shows in a three-dimensional illustration a first embodiment of the core of the present invention, i.e., the application device 1.

The application device 1 includes a pair of cantilevers 2 and 3. These cantilevers 2, 3 are arranged so as to extend parallel relative to each other. They extend inclined toward a horizontal direction starting from a rearward end located at a machine body 4 toward a front free end 5. Provided between the cantilevers is an intermediate space 6 in the area of the free end 5. Each of the cantilevers 2, 3 includes a supply unit, wherein the supply units are formed by an upper rotating endless belt 7 or 8 and a lower rotating endless belt 9 or 10. These rotating endless belts 7 and 9, 8 and 10 contact each other at surfaces which face each other. The lower endless belt 10 of the cantilever 3 illustrated in the Figure on the right hand side thereof is shortened. In contrast, in the area underneath the upper endless belt 8, in which the lower endless belt already no longer extends, a stop element 11 and a guide element 12 are arranged.

In a portion facing the machine body 4, a guide sheet metal 13 is positioned between the cantilevers 2 and 3. A drive 14 which can be synchronized is arranged at the machine body 4 for driving the endless belts 7-10. Finally, a magazine 15 for receiving suspended labels to be placed is arranged at the engine body, wherein a conveyor belt 16 produces the connection between the magazine 15 and the cantilevers 2, 3. The magazine 15 is limited with respect to movement by means of sheet metal pieces, which can be moved in their positions.

Figure 2:
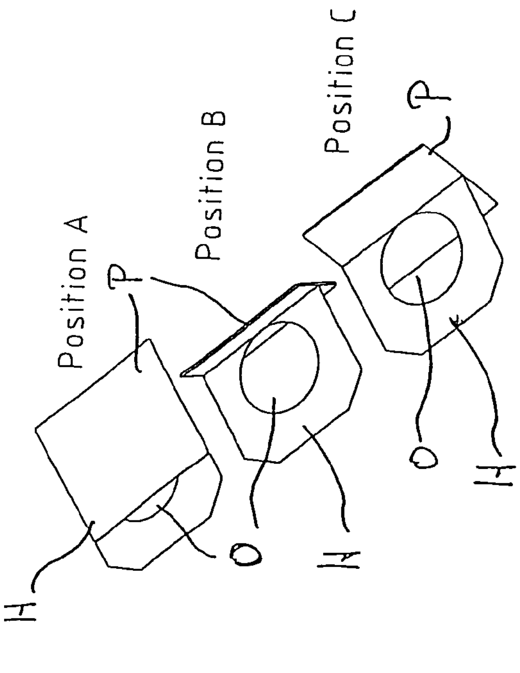
FIG. 2 is a schematic illustration of a typical suspended label in three different positions.

FIG. 2 shows different positions of an example of a suspended label H which is to be applied on a bottleneck. In addition, a foldable brochure P is mounted on the label in a second portion thereof.

Figure 3:
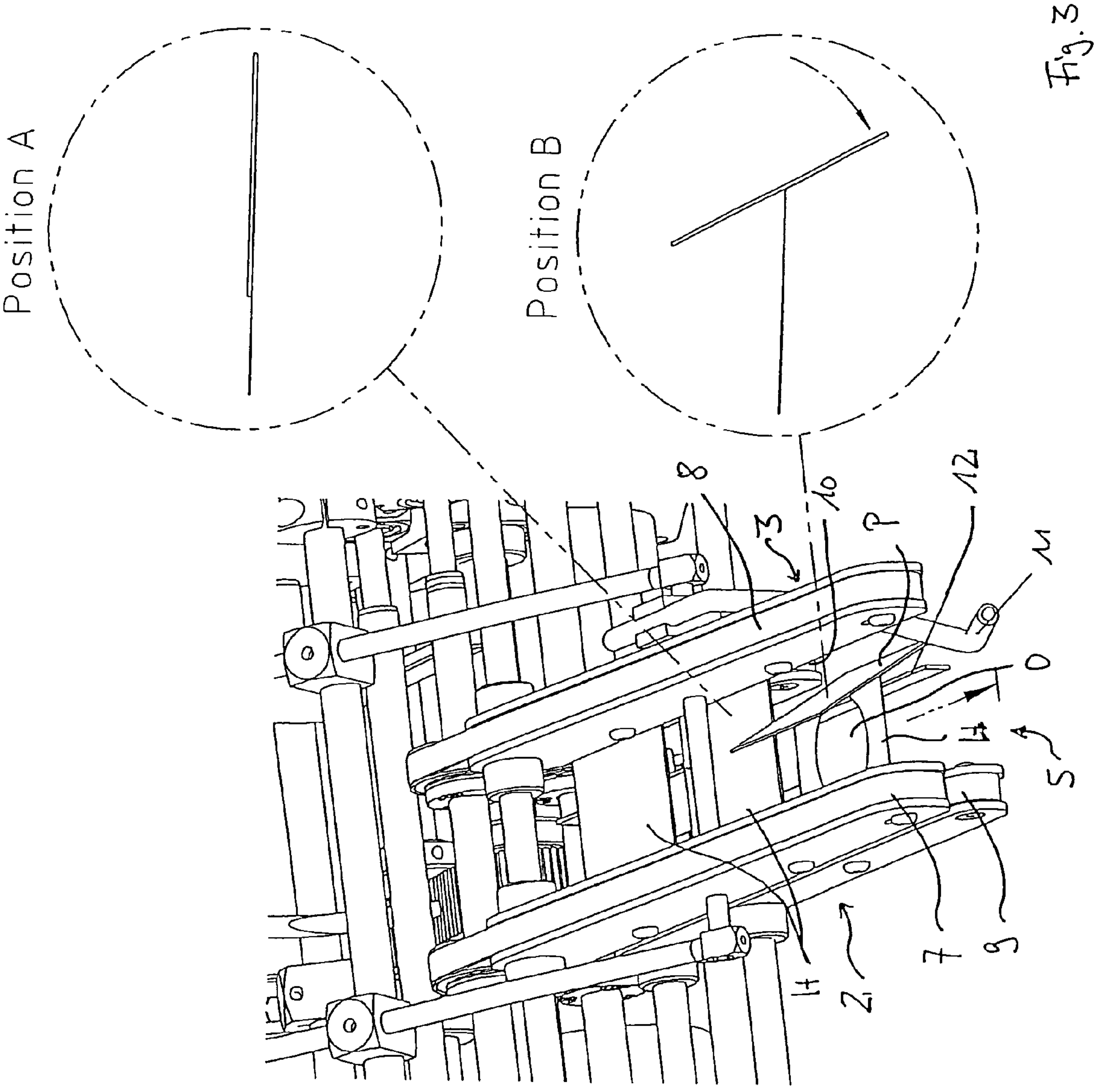
FIG. 3 is an enlarged view of the cantilevers of the application device shown in FIG. 1 including suspended labels which are conveyed by the device.
Figure 5B:
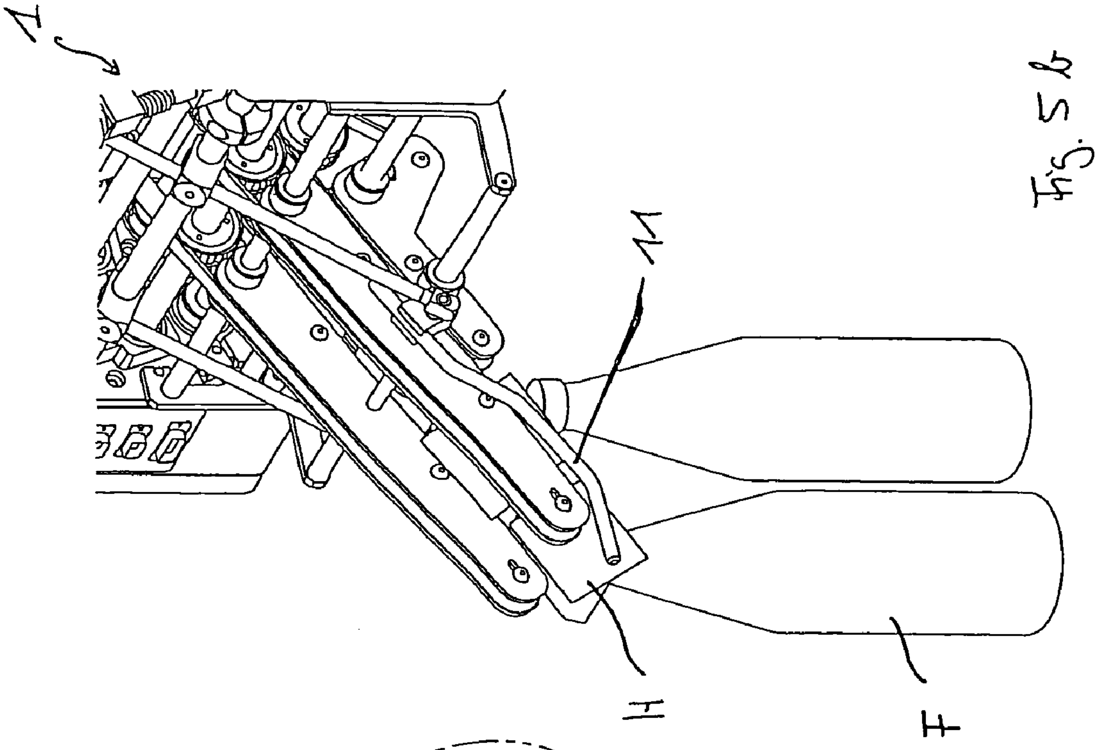
FIGS. 5*a* and 5*b*, in principle, show the manner of operation of the device according to the present invention when suspended labels are mounted on bottlenecks in a first position.
Figure 5A:
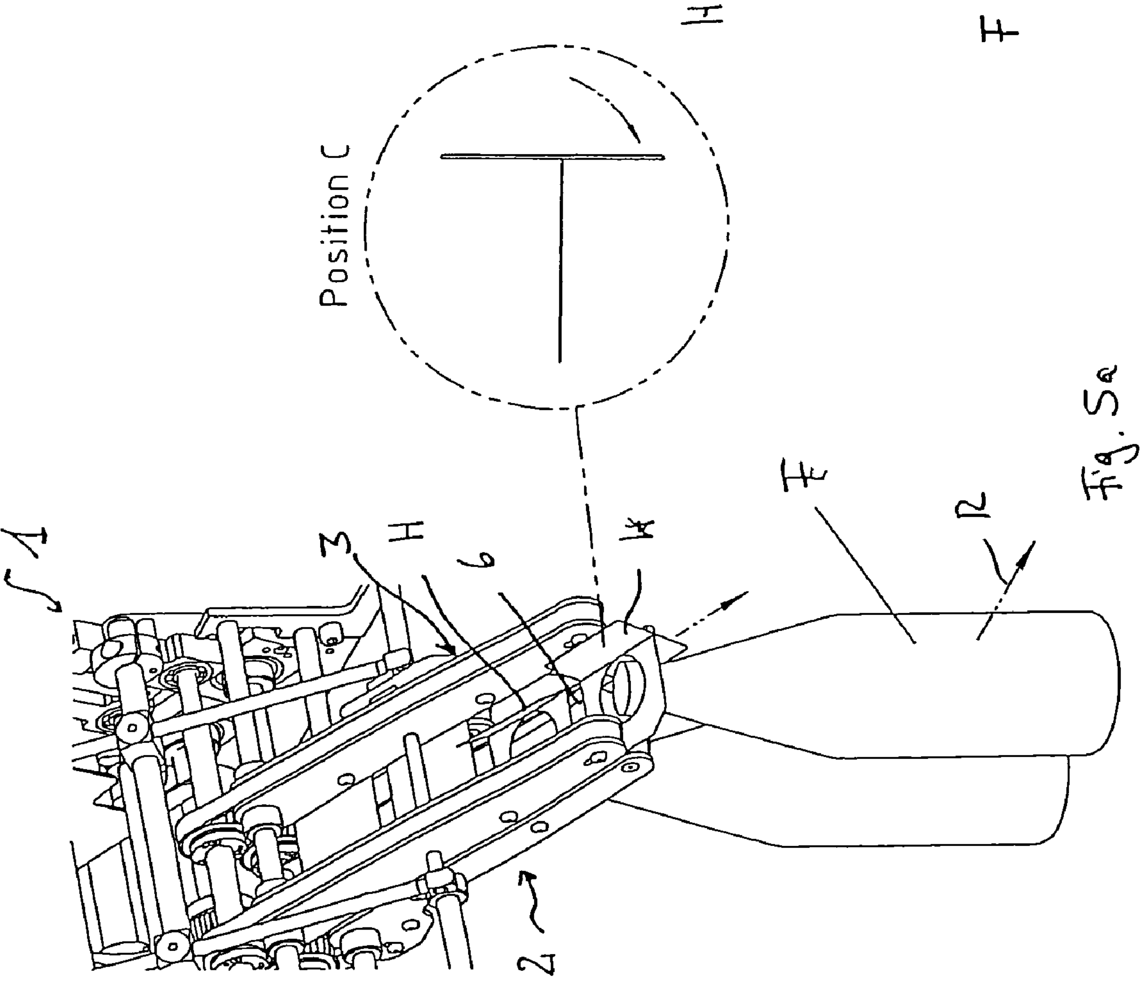
Figure 6B:
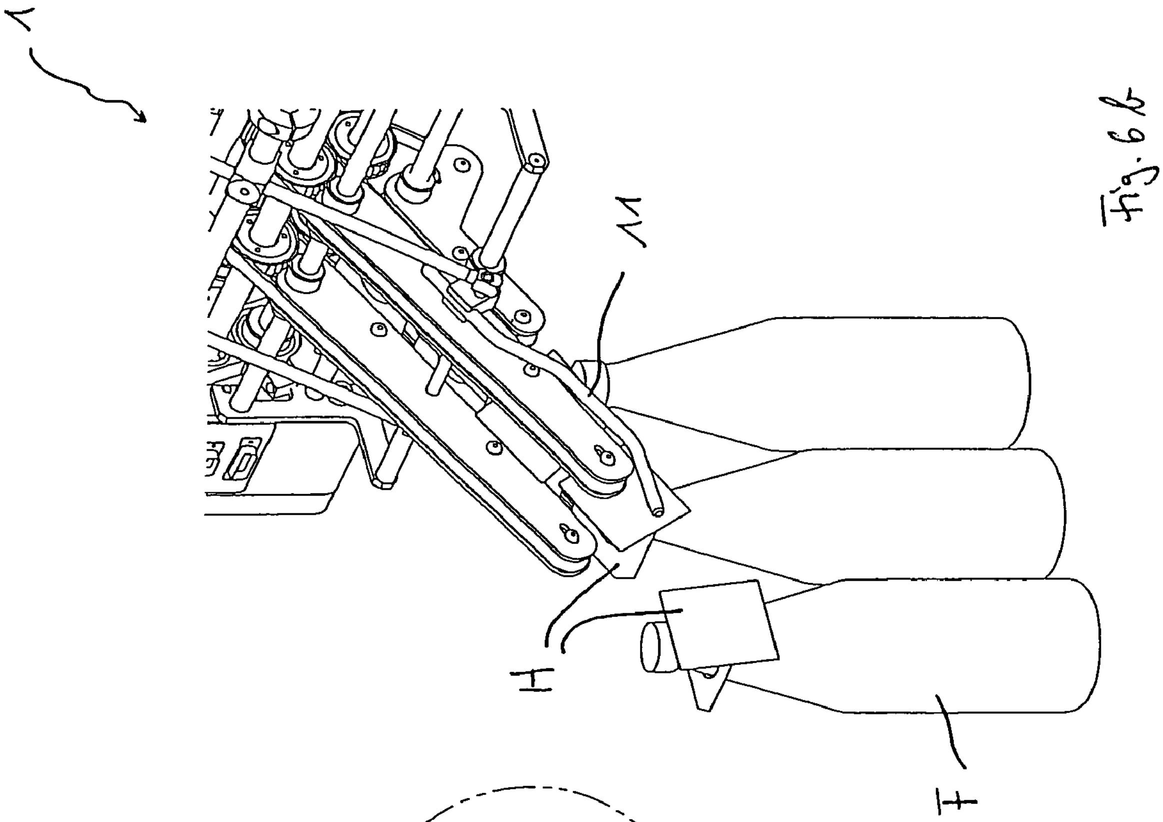
FIGS. 6*a* and 6*b* show, in a similar manner to FIGS. 5*a* and 5*b*, the sequence of the method in a next step.
Figure 6A:
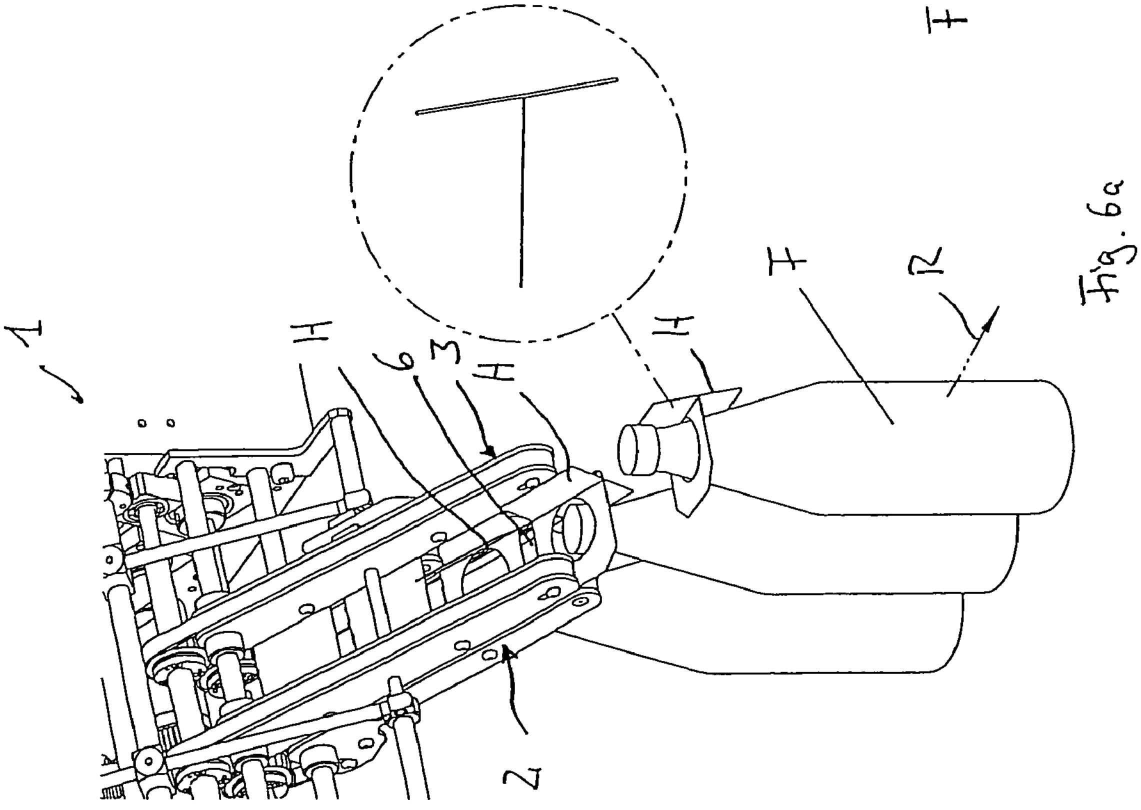

FIG. 3 shows on a larger scale a detail of the application device 1, wherein the two cantilevers 2, 3 are shown. In this view, it is shown that the suspended labels H are guided along the cantilever in a work area or a supply position. The suspended labels H are for this purpose grasped at two oppositely located ends between the endless belts 7 and 9 or 8 and 10. The endless belts are driven synchronously by the drive 14. Initially, the suspended labels H are transported in a configuration A illustrated in FIG. 2 in which they are folded flat. At the free end 5 of the cantilever, the brochure portion P of a suspended label is straightened up into the position B as the result of an interaction of the stop elements 11 and the guide elements 12. For this purpose, the lower endless belt 10 of the cantilever 3 shown at the right hand side of the Figure is shortened, so that the cantilever no longer acts on the suspended label in the area in which the brochure portion P of the suspended label H is no longer acting on the suspended label. The suspended label H travels with the brochure portion P against the stop element 11 and is transported by the endless belts 7 and 9. As a result, the brochure portion P is straightened in a forced manner. The guide element 12 prevents a folding over of the brochure portion P. By straightening the brochure part P, the opening H in the suspended label becomes vacant so that a bottle with its neck can protrude into the opening.

Figure 4:
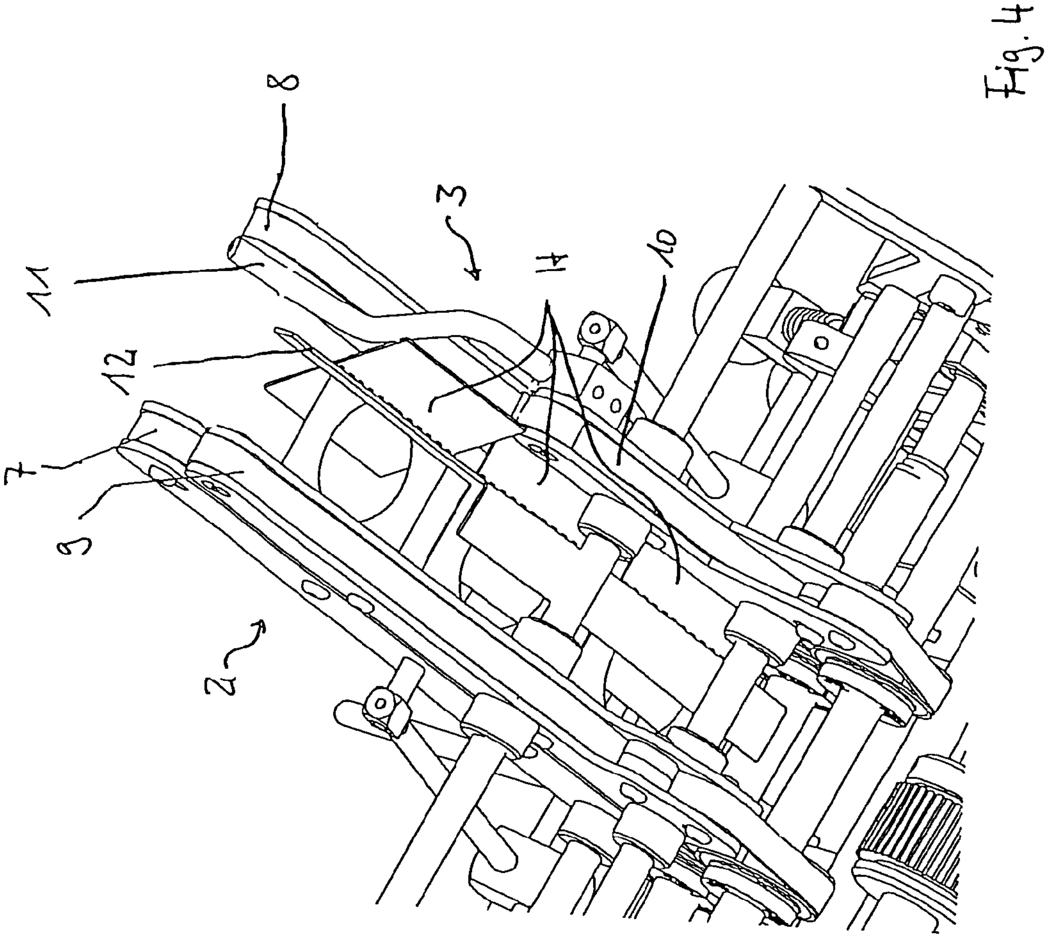
FIG. 4 is a bottom view of the situation illustrated in FIG. 3.

The situation shown in FIG. 3 is once again shown in FIG. 4 in an illustration from below.

Finally, FIGS. 5*a* and 5*b* or 6*a* and 6*b* schematically show the sequence of suspending or placing the suspended labels onto necks of bottles F, which travel underneath the application device 1. FIGS. 5*a* and 5*b* or 6*a* and 6*b* illustrate different stages of processing, presented from two different angles of view.

On a bottle-conveying device, not shown, bottles travel in a conveying direction R between cantilevers 2, 3 which are essentially parallel to the conveyor direction R. In this connection, the drive of the endless belts of the cantilevers 2, 3 and the drive of the bottle conveying device are adjusted relative to each other in such away that initially suspended labels H can be moved at a speed which is faster than the speed of the bottle conveying device into an initial position at the end of the cantilevers 2, 3. At this location, the suspended label is prepared by means of the stop element 11 and the guide element 12. When a bottle travels with its neck into the area of the opening O of the suspended label H, the drive of the endless belts is started and operated with a speed which is similar to the speed of the conveying direction of the bottles. As a result, it is ensured that when leaving the cantilevers 2, 3 the suspended labels slide securely over the bottleneck without there being the danger that the suspended label H tears in the area of the opening O.

This synchronization can be reinforced in an advantageous manner by sensors, which indicate and control the drives of the endless belts the approach of a bottle at a transfer point in which the suspended label H much be “thrown”.

Figure 7:
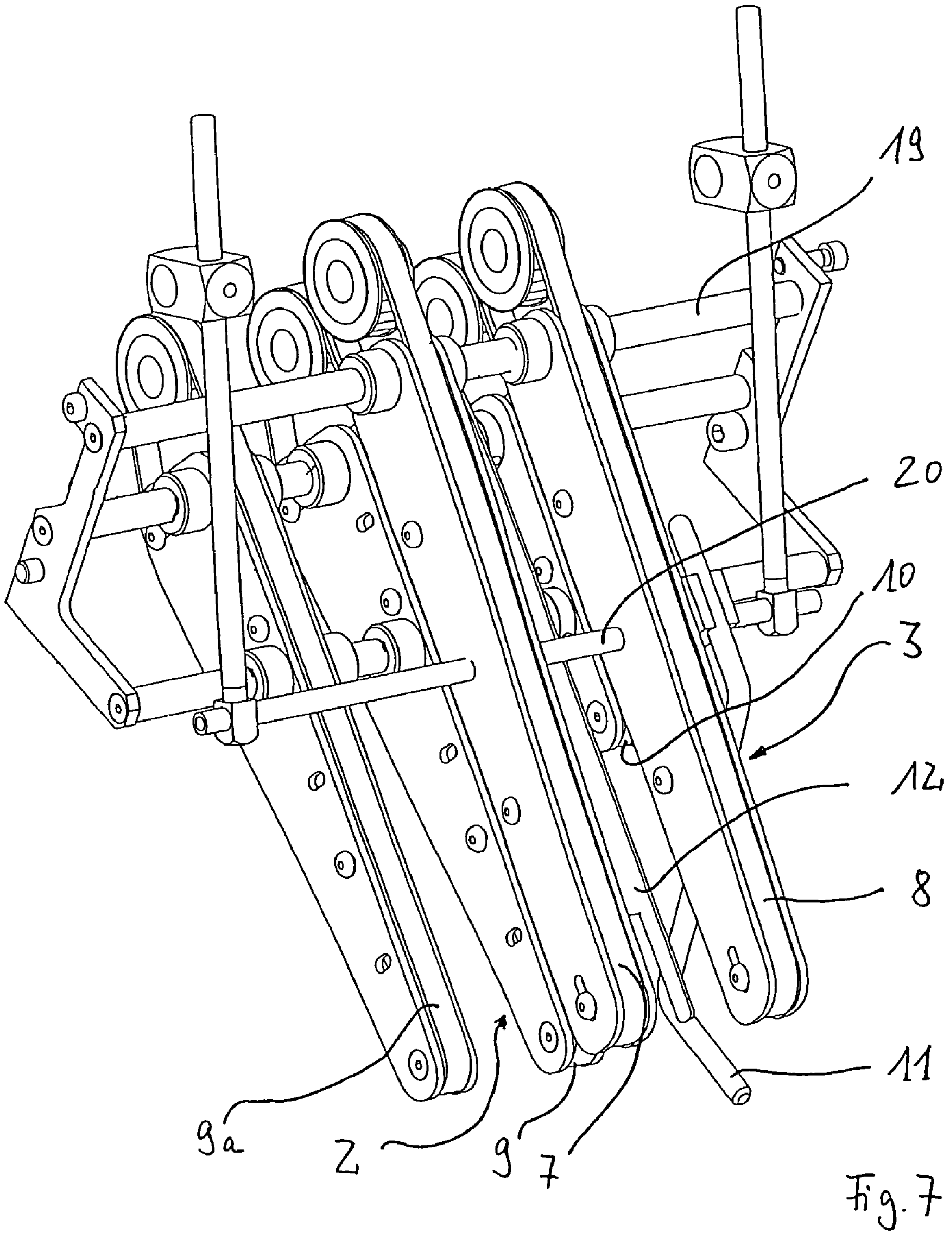
FIG. 7 is a view comparable to FIG. 3 showing an arrangement of cantilevers in an alternative embodiment of the device (without conveyed suspended labels).

FIG. 7 illustrates the cantilever unit of a second embodiment of the device according to the present invention. This device is constructed essentially the same as the one described in connection with FIGS. 1 and 3-6. This embodiment merely additionally comprises a third endless belt 9*a* in a group of lower endless belts. The distance between the endless belt 9*a* and the endless belt 9 is identical to the distances between the endless belts 7 and 8 or 9 and 10.

The endless belt 9*a* has dimensions which are identical to those of the endless belt 9. This third endless belt 9*a* in the lower group has the purpose of making the device according to the present invention more flexible. In the position illustrated in FIG. 7, the device with the stop elements 11 and the guide elements 12 can be used as described above.

However, by displacing the upper group of endless belts 7, 8 along the rods 19, 20, a situation can be produced in which the upper endless belts 7 and 8 are located opposite the lower endless belts 9*a* and 9. The shortened endless belt 10 with the stop element 11 and the guide element 12 are then exposed in their work area. In this situation, the device can also be used for placing "conventional" suspended labels, which do not require to be straightened.

The embodiments illustrated and described are not limiting and merely serve for explaining the invention. In particular, other types of suspended labels can be placed, wherein the labels have a different configuration and require stop devices, which may be constructed completely differently.

While specific embodiments of the invention have been shown and described in detail to illustrate the inventive principles, it will be understood that the invention may be embodied otherwise without departing from such principles.

We claim:

1. A device for placing suspended labels including a multiple-page information section onto a bottleneck, the device comprising a bottle conveying device for conveying bottles into a work area, and an application device having a pair of essentially parallel cantilevers which define a horizontal distance therebetween and end in the work area, each cantilever comprising a supply unit for grasping one side of the suspended label and for supplying the suspended label, wherein the cantilevers define an open intermediate space therebetween and are arranged such that a bottle reaching the work area extends with its neck into the intermediate space, further comprising a stop in the area of the supply units for straightening the information portion of the suspended label, wherein the supply units each comprise two driven endless belts which are arranged to be placed vertically opposite each other, and wherein the stop is arranged in an area of one of the supply units, wherein a lower one of the endless belts is constructed so as to be shorter than an upper endless belt.

2. The device according to claim 1, wherein the stop is comprised of at least two elements, wherein the two elements are a stop element and a guide element.

3. The device according to claim 2, further comprising a drive for synchronously driving the supply units, wherein the drive for the supply units is adjusted to a drive of the bottle conveying device with respect to a driving start time and a drive speed.

4. The device according to claim 1, comprising a first group of two upper endless belts and a second group of three lower endless belts, wherein the two groups of endless belts are slidable in an essentially horizontal direction relative to each other in such a way that the two endless belts of the first group engage two endless belts of the second group so as to form two supply units, wherein the stop is provided in an area of another endless belt arranged outside of the two groups.

5. The device according to claim 1, wherein the application device comprises a magazine for suspended labels, and means for supplying individual suspended labels from the magazine to the cantilevers.

* * * * *